United States Patent
Wobben

(10) Patent No.: US 6,924,627 B1
(45) Date of Patent: Aug. 2, 2005

(54) METHOD OF REACTIVE POWER REGULATION AND APARATUS FOR PRODUCING ELECTRICAL ENERGY IN AN ELECTRICAL NETWORK

(76) Inventor: Aloys Wobben, Argestrasse 19, Aurich (DE), D-26607

( * ) Notice: Subject to any disclaimer, the term of this patent is extended or adjusted under 35 U.S.C. 154(b) by 0 days.

(21) Appl. No.: 10/088,011
(22) PCT Filed: Sep. 7, 2000
(86) PCT No.: PCT/EP00/08745
§ 371 (c)(1),
(2), (4) Date: Aug. 12, 2002
(87) PCT Pub. No.: WO01/20745
PCT Pub. Date: Mar. 22, 2001

(30) Foreign Application Priority Data

Sep. 13, 1999 (DE) ......................... 199 43 847
Apr. 27, 2000 (DE) ......................... 100 20 635

(51) Int. Cl.$^7$ ............... H02P 7/28; H02P 6/00; H02P 9/14; G05F 5/04
(52) U.S. Cl. ............... 322/20; 322/17; 290/7; 290/40 C; 290/40 R
(58) Field of Search ............... 322/17, 20; 290/40 C, 290/40 R, 7

(56) References Cited

U.S. PATENT DOCUMENTS

| | | | | |
|---|---|---|---|---|
| 2,652,529 A | * | 9/1953 | Alexanderson ............... | 323/210 |
| 3,400,326 A | * | 9/1968 | Ryzhov et al. ............... | 323/210 |
| 3,754,184 A | * | 8/1973 | Stone ............... | 323/210 |
| 3,829,759 A | * | 8/1974 | Thorborg ............... | 323/207 |
| 3,900,792 A | * | 8/1975 | Moltgen ............... | 323/207 |
| 3,936,727 A | * | 2/1976 | Kelley et al. ............... | 323/210 |
| 3,963,978 A | * | 6/1976 | Kelley et al. ............... | 323/210 |
| 3,968,422 A | * | 7/1976 | Waldmann ............... | 323/207 |
| 3,968,432 A | * | 7/1976 | Kelley, Jr. ............... | 324/107 |
| 3,983,469 A | * | 9/1976 | Brown ............... | 363/48 |
| 3,999,117 A | * | 12/1976 | Gyugyi et al. ............... | 323/211 |
| 4,019,124 A | * | 4/1977 | Moltgen ............... | 323/207 |
| 4,028,614 A | * | 6/1977 | Kelley, Jr. ............... | 323/210 |
| 4,110,631 A | * | 8/1978 | Salter ............... | 290/55 |
| 4,242,628 A | * | 12/1980 | Mohan et al. ............... | 322/35 |
| 4,299,198 A | * | 11/1981 | Woodhull ............... | 126/247 |
| 4,315,163 A | * | 2/1982 | Bienville ............... | 307/66 |
| 4,349,744 A | * | 9/1982 | Reuther et al. ............... | 290/40 C |
| 4,366,387 A | * | 12/1982 | Carter, Jr. et al. ............... | 290/55 |
| 4,400,659 A | * | 8/1983 | Barron et al. ............... | 322/32 |
| 4,409,050 A | * | 10/1983 | Carter et al. ............... | 156/172 |
| 4,445,049 A | * | 4/1984 | Steigerwald ............... | 307/45 |

(Continued)

FOREIGN PATENT DOCUMENTS

| | | |
|---|---|---|
| DE | 38 18 732 A1 | 12/1989 |
| JP | 4-289732 | 10/1992 |
| JP | 11-4543 | 1/1999 |
| WO | WO 92/14298 | 8/1992 |

*Primary Examiner*—Darren Schuberg
*Assistant Examiner*—Pedro J. Cuevas
(74) *Attorney, Agent, or Firm*—Seed IP Law Group PLLC

(57) ABSTRACT

A method of reactive power regulation in an electrical network in which electrical power is produced by an electrical generator preferably driven by the rotor of a wind power installation and suitably modulated by means of a compensation device between the generator and the network for the compensation of reactive power, and an apparatus for producing electrical energy in an electrical network, preferably an electrical generator driven by the rotor of a wind power installation and a compensation device between the generator and the network for the compensation of reactive power. The compensation device is so regulated that the electrical power delivered to the consumer has a reactive power component which is adapted in respect of its phase, amplitude and/or frequency to the consumer in such a way as to compensate for the reactive power in the consumer.

37 Claims, 4 Drawing Sheets

U.S. PATENT DOCUMENTS

| | | | |
|---|---|---|---|
| 4,451,777 A | | 5/1984 | Gyugyi ........................ 323/210 |
| 4,570,214 A | * | 2/1986 | Tanaka ........................ 363/160 |
| 4,590,416 A | * | 5/1986 | Porche et al. ................. 323/205 |
| 4,647,837 A | * | 3/1987 | Stemmler .................... 323/207 |
| 4,677,364 A | * | 6/1987 | Williams et al. .............. 322/47 |
| 4,695,736 A | * | 9/1987 | Doman et al. ................. 290/44 |
| 4,752,726 A | * | 6/1988 | Aoyama ...................... 323/207 |
| 5,138,247 A | * | 8/1992 | Tanoue et al. ............... 323/207 |
| 5,148,362 A | * | 9/1992 | Braun et al. .................. 363/95 |
| 5,166,597 A | * | 11/1992 | Larsen et al. ................. 323/215 |
| 5,225,712 A | | 7/1993 | Erdman ....................... 290/44 |
| 5,329,221 A | * | 7/1994 | Schauder ..................... 323/207 |
| 5,343,139 A | * | 8/1994 | Gyugyi et al. ............... 323/207 |
| 5,428,283 A | * | 6/1995 | Kalman et al. .............. 318/729 |
| 5,466,973 A | * | 11/1995 | Griffioen ..................... 307/17 |
| 5,469,044 A | * | 11/1995 | Gyugyi et al. ............... 323/207 |
| 5,513,090 A | | 4/1996 | Bhattacharya et al. ........ 363/40 |
| 5,548,504 A | * | 8/1996 | Takehara ..................... 363/65 |
| 5,604,420 A | * | 2/1997 | Nambu ........................ 322/19 |
| 5,637,985 A | * | 6/1997 | Kakizaki et al. .............. 322/28 |
| 5,698,968 A | * | 12/1997 | Takagi et al. ................. 322/58 |
| 5,734,257 A | * | 3/1998 | Schauder et al. ............ 323/207 |
| 5,734,586 A | * | 3/1998 | Chiang et al. ............... 700/286 |
| 5,736,838 A | * | 4/1998 | Dove et al. .................. 323/211 |
| 5,793,593 A | * | 8/1998 | Reed et al. ................. 361/93.4 |
| 5,808,880 A | * | 9/1998 | Marvin ........................ 363/37 |
| 5,841,267 A | * | 11/1998 | Larsen ....................... 323/215 |
| 5,892,664 A | * | 4/1999 | Vedder ....................... 363/17 |
| 6,051,941 A | * | 4/2000 | Sudhoff et al. ............. 318/140 |
| 6,107,784 A | * | 8/2000 | Nomiya et al. ............. 323/205 |
| 6,137,187 A | * | 10/2000 | Mikhail et al. ................ 290/44 |
| 6,265,852 B1 | * | 7/2001 | Kitamura et al. ............. 322/59 |
| 6,323,618 B1 | * | 11/2001 | Kitamura et al. ........... 318/700 |
| 6,338,009 B1 | * | 1/2002 | Sato et al. .................. 700/286 |
| 6,397,157 B1 | * | 5/2002 | Hogle et al. .................. 702/65 |
| 6,573,691 B2 | * | 6/2003 | Ma et al. ..................... 323/209 |
| 6,605,880 B1 | * | 8/2003 | Jaunich ....................... 307/80 |
| 6,628,103 B2 | * | 9/2003 | Sumiya et al. ................. 322/20 |
| 6,670,721 B2 | * | 12/2003 | Lof et al. ..................... 290/44 |
| 6,671,585 B2 | * | 12/2003 | Lof et al. ................... 700/291 |
| 6,784,564 B1 | * | 8/2004 | Wobben ....................... 290/44 |
| 6,794,855 B2 | * | 9/2004 | Shimomura et al. .......... 322/59 |
| 6,806,688 B2 | * | 10/2004 | Noro et al. ................... 322/20 |
| 6,825,640 B1 | * | 11/2004 | Hill et al. ..................... 322/46 |

\* cited by examiner

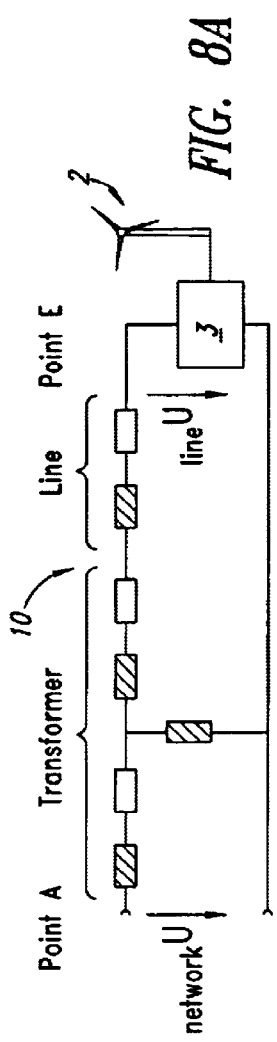
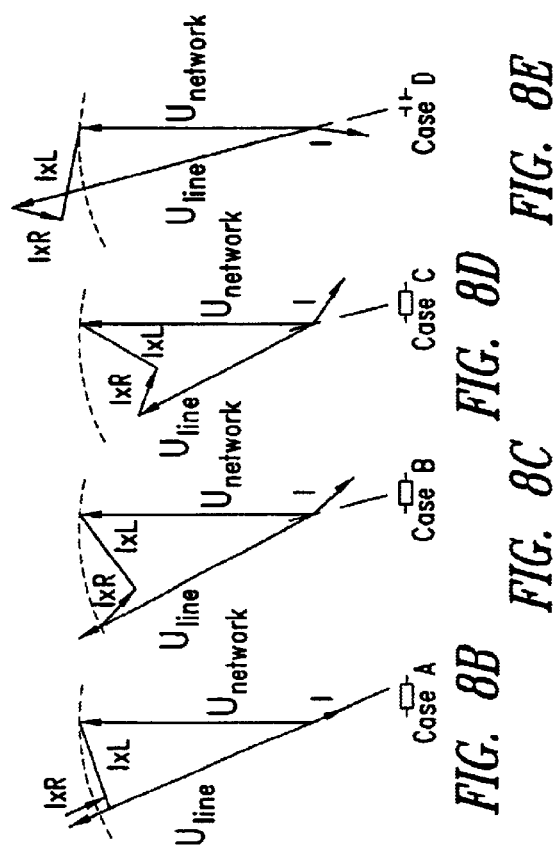

METHOD OF REACTIVE POWER REGULATION AND APARATUS FOR PRODUCING ELECTRICAL ENERGY IN AN ELECTRICAL NETWORK

TECHNICAL FIELD

The invention concerns a method of reactive power regulation in an electrical network, in which electrical power is produced by an electrical generator preferably driven by the rotor of a wind power installation and suitably modulated by means of a compensation device between the generator and the network for the compensation of reactive power. The invention further concerns an apparatus for producing electrical energy in an electrical network, comprising an electrical generator preferably driven by the rotor of a wind power installation and a compensation device between the generator and the network for the compensation of reactive power.

BACKGROUND OF THE INVENTION

Many consumers connected to the electrical network require inductive reactive power. Compensation of such an inductive reactive power component is effected by using capacitors which are also referred to as phase-shifting capacitors whose capacitive reactance is approximately as high as the inductive reactance. Complete compensation of the inductive reactive power by means of phase-shifting capacitors is however not possible in practice precisely when high power fluctuations are involved. A further disadvantage is that the phase-shifting capacitors required, which are frequently combined together to form what is referred to as capacitor batteries and which moreover take up a great deal of space have a negative effect on the stability of the electrical network.

SUMMARY OF THE INVENTION

The object of the present invention is to compensate for the reactive power in an electrical network in a simple fashion.

In a method and an apparatus of the kind set forth in the opening part of this specification, that object is attained in that the compensation device is so regulated that the electrical power delivered to the consumer has a reactive power component which is adapted in respect of its phase, amplitude and/or frequency to the consumer in such a way as to compensate for the reactive power in the consumer.

In accordance with the invention, by means of the compensation device, a reactive power is 'produced', which is in a position to compensate for the reactive power in the consumer. For example, by means of the compensation device according to the invention, it is possible to produce a capacitive reactive power component which is adapted to the inductive reactive power component required by the consumer, in such a way that it substantially completely compensates for the inductive reactive power component in the consumer. The advantage of the invention is thus essentially that there is provided a regulating system which rapidly reacts in particular to frequently occurring high power fluctuations, so that complete reactive power compensation is substantially maintained. Accordingly, inductive or capacitive reactive power can be fed selectively into the electrical network, which in accordance with the invention is implemented by regulation of the compensation device.

In this respect, by means of the regulation in accordance with the invention, it is preferably also possible for the electrical power produced to be of a frequency which corresponds to the frequency of the consumer or also represents a multiple of the consumer frequency. In the former case accordingly reactive power can be supplied at the frequency of the consumer or the network frequency of the electrical network. In the latter case for example as desired harmonic reactive power can be fed into the electrical network. For example the fifth harmonic can be fed into the network, at a frequency of 250 Hz, as a capacitive harmonic. That then compensates for the harmonic reactive power of electrical consumers which are connected to the electrical network such as for example televisions, energy-saving lamps and so forth.

Desirably the compensation device has an inverter with which phase, amplitude and/or frequency of the voltage and/or current characteristics can be particularly easily adjusted or regulated in order to produce a reactive power component which is suitable for appropriately compensating for the reactive power in the consumer.

Preferably the compensation device has a measuring device for detecting the voltage and/or current variations in the electrical network, preferably at the feed-in point. In a development of the embodiment in which the compensation device includes an inverter the compensation device controls the inverter in dependence on the measurement results of the measuring device.

The voltage produced by the electrical generator is preferably regulated substantially to a predetermined reference value with suitable adaptation of the reactive power component in the electrical power delivered to the consumer. In that situation adaptation of the reactive power component can take place by suitable control of the power factor ($\cos \phi$) or the phase of the current produced by the electrical generator. If the electrical generator is connected to an electrical network by way of a line and/or a transformer then the voltage produced by the electrical generator is desirably so regulated that the value thereof is in the order of magnitude of the value of the network voltage or corresponds thereto. That avoids undesirably high or low voltages at the generator side. Usually the network voltage is substantially constant if it involves a substantially rigid network.

BRIEF DESCRIPTION OF THE DRAWINGS

Preferred embodiments of the invention are described in greater detail hereinafter with reference to the accompanying drawings in which:

FIG. 8 shows an equivalent circuit diagram of an electrical network with a transformer and an electrical overhead line (a) to which an electrical generator of a wind power installation is connected, as well as vector diagrams (b to e) representing various operating conditions.

DETAILED DESCRIPTION OF THE PREFERRED EMBODIMENTS

Figure 1:
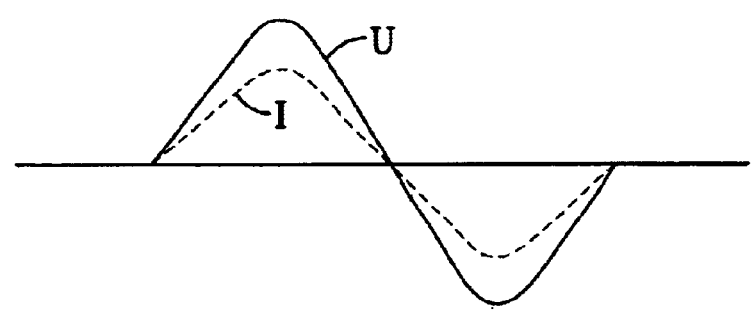
FIGS. 1 to 4 show various voltage and current configurations.
Figure 2:
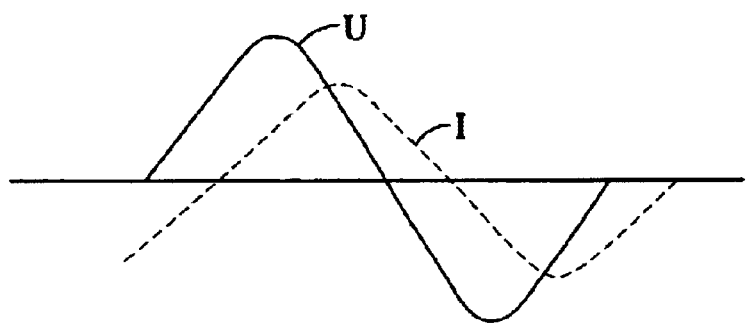
Figure 3:
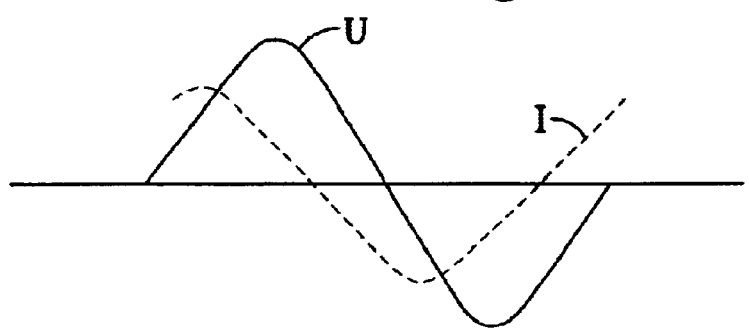

The occurrence of fundamental oscillation reactive powers in an electrical network has already long been known. FIGS. 1 to 3 show various voltage and current configurations.

FIG. 1 shows a situation in which there is no reactive power, that is to say voltage U and current 1 are not phase-shifted. The current neither leads nor trails the voltage. There is therefore no fundamental oscillation reactive power.

FIG. 2 shows the situation in which the current I trails the voltage U in respect of time. In this respect, inductive reactive power is required, which is the case with most electrical consumers as they—such as for example electric motors have inductors.

FIG. 3 shows the situation in which the current I leads the voltage U in respect of time. Capacitive reactive power is required in this case.

Figure 4:
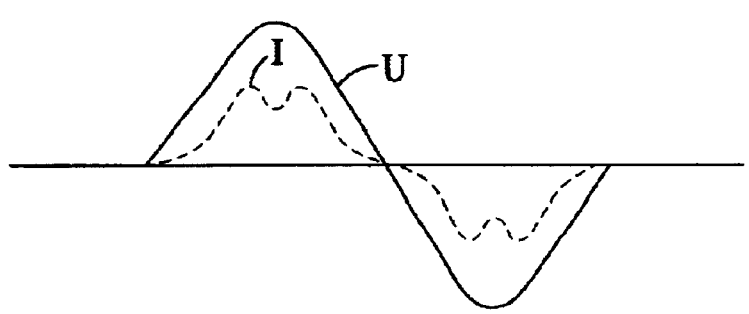
Figure 5:
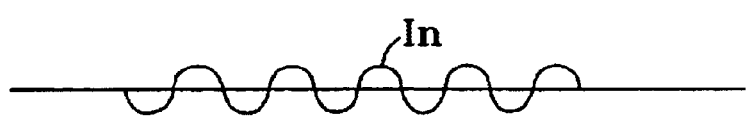
FIG. 5 shows the harmonic component from the current configuration of FIG. 4.

FIG. 4 shows an oscillation in the reactive power. FIG. 5 shows the harmonic component from the current configuration of FIG. 4.

Figure 6:
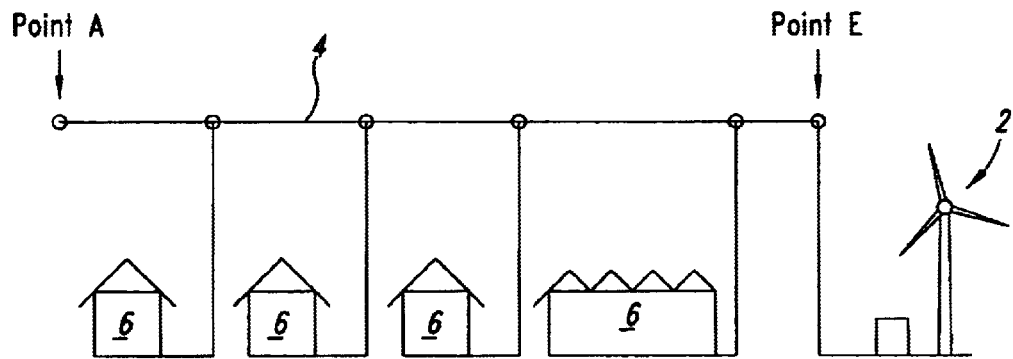
FIG. 6 diagrammatically shows a network spur to which a wind power installation and consumer are connected.

FIG. 6 shows an arrangement in which a wind power installation 2 is connected to a network spur. Consumers 6 are connected from the beginning (point A) to the end (point E) of the network spur or the electrical line 4. If the wind power installation 2 is not feeding into the network, the voltage drops increasingly from the beginning (point A) to the end (point E) of the line 4; the voltage at the point E and the most closely adjacent last consumer 6 is thus lower than at the point A and the first consumer 6 which is most closely adjacent to that point A, on that electrical line 4. If now the wind power installation 2 or a larger wind park is connected at the end of the electrical line 4 at point E in FIG. 6 and current is fed into the electrical line 4 the connection voltage at the point E of the electrical line 4 rises in an extreme fashion. The situation which occurs is now the reverse of the case without the wind power installation 2 connected at the end of the electrical line 4.

Figure 7:
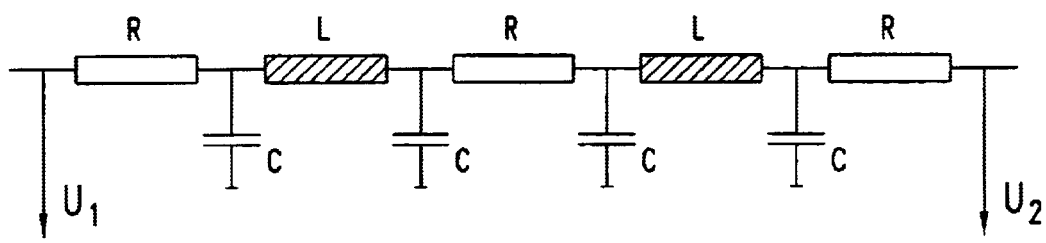
FIG. 7 shows an equivalent circuit diagram of an electrical line.

For the situation where the electrical line is in the form of a free or overhead line (no ground cable), such a line in fact essentially represents an inductor. In comparison ground cables generally represent a damped capacitor. In that respect attention is directed to the equivalent circuit diagram of a line, as shown in FIG. 7.

The voltage at the feed-in point (point E in FIG. 6) can be regulated by means of reactive power regulation at the wind power installation. Preferably an inverter is used for that purpose.

FIG. 8a shows an equivalent circuit diagram wherein the electrical generator 3 of the wind power installation 2 is connected by way of a line and a transformer to an electrical network (not shown) which is usually a fixed network.

FIGS. 8b to 8e show vector diagrams in relation to various operating conditions. In case A as shown in FIG. 8b the generator 3 of the wind power installation 2 only feeds active power into the electrical network 10; it can be seen immediately that the voltage $U_{line}$ at the feed-in point (point E) is higher than the voltage $U_{network}$ at the point A. In case B as shown in FIG. 8c a component of inductive reactive power is fed into the network in addition to the active power and it can be seen that the voltages $U_{line}$ and $U_{network}$ at the end at point E and at the beginning point A are equal. The case C shown in FIG. 8d illustrates in comparison that too much inductive reactive power is being fed into the network; the consequence of this is that the voltage $U_{line}$ at the point E becomes too low. The case D in FIG. 8e shows the situation when excessive capacitive reactive power is being fed into the network; consequently the voltage $U_{line}$ at the feed-in point/point E rises very greatly in relation to the voltage $U_{network}$. The latter situation absolutely has to be avoided.

To provide for reactive power compensation an inverter (not shown) is connected between the generator 3 and the point E as shown in FIG. 8a. Now the function of such an inverter is to exactly follow a predetermined voltage value insofar as the cos ϕ of the output current is correspondingly rapidly and dynamically regulated.

In addition harmonic reactive powers occur in the electrical network. More specifically, electrical consumers increasingly require a current which includes harmonics or produce harmonics in the electrical network, such as for example television units which at the input have a rectifier or industrial operations which operate regulated rectifier drives. FIG. 4 shows a situation in which harmonic reactive power is required. The voltage configuration U is virtually sinusoidal while the current 1, besides the fundamental oscillation, also includes harmonics. It is possible to clearly see here the fifth harmonic. FIG. 5 shows the required fifth harmonic as a separate component In of the current 1.

Such harmonics in the current configuration (current harmonics) cause in the electrical network voltage harmonics which adversely affect the quality of the voltage in the electrical network. It is therefore necessary for such harmonic reactive powers also to be compensated.

Figure 9:
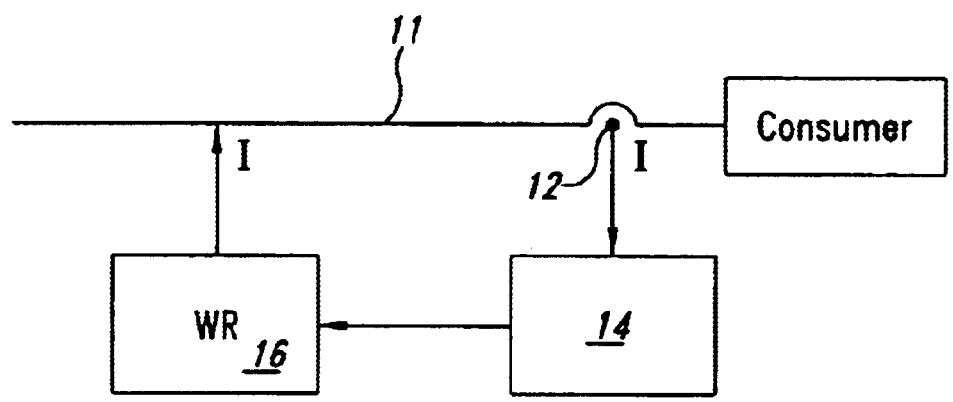
FIG. 9 shows a schematic circuit diagram of an arrangement for compensating for harmonic currents in a tap line.

FIG. 9 shows a tap line 11 which is connected with its one end (at the left in FIG. 9) to an electrical network (not shown) while consumers 6 are connected to the other end thereof (at the right in FIG. 9). Such a tap line 11 can for example supply an industrial area or park or one or more villages with electric current. The current flowing to the consumers 6 is measured by means of a current transformer 12. The measurement signal from the transformer 12 is passed to an evaluation circuit 14 which continuously analyses on-line which current harmonics are contained in the current on the tap line 11. That measurement results serves as a reference value which is fed as an output signal to an inverter 16 which then produces substantially at the same time the required harmonics and feeds same into the electrical line 11 upstream of the transformer 12. That ensures that the required harmonics reactive power is produced by the inverter 16 for compensation of the harmonic reactive power present in the electrical network, and is not taken from the electrical network.

Figure 10:
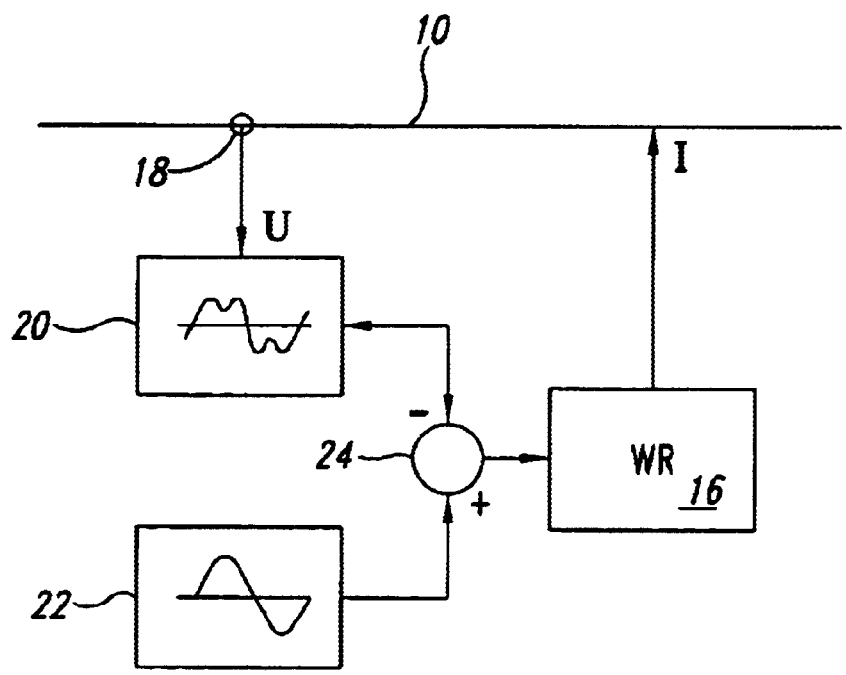
FIG. 10 shows a schematic circuit diagram of an arrangement for compensating for harmonic currents in an electrical network.

FIG. 10 diagrammatically shows the electrical network 10 whose voltage is measured by means of a voltage transformer 18. The measurement signal from the voltage transformer 18 is fed to an evaluation device 20. There is also a reference value device 22 which predetermines the desired voltage configuration. The output signal of the voltage device 20 is deducted by a subtracting device 24 from the output signal of the reference value device 22 and the difference output signal, resulting therefrom, from the subtracting device 24 is fed to the inverter 10 which then substantially at the same time produces the required harmonics in order to compensate for the harmonic reactive power in the electrical network. In this arrangement therefore the network voltage is measured by means of the voltage transformer 18 and the evaluation device 20 serves to detect which harmonics are contained in the voltage configuration. More specifically the harmonic currents in the electrical network 10 produce at the network impedance voltage drops corresponding to the frequency and amplitude thereof. The values which are measured and calculated in that way are predetermined for the inverter 16 as current reference values. The inverter 16 then, produces, in accordance with the reference values, the current harmonics with the required frequencies, amplitudes and phase positions.

What is claimed is:

1. A method of reactive power regulation in an electrical network, comprising:

producing electrical power by an electrical generator driven by the rotor of a wind power installation and modulating the power by means of a compensation device between the generator and the network for the compensation of reactive power by adaptation of the phase and/or amplitude of the reactive power component of the delivered electrical power, and regulating the compensation device so that the electrical power delivered to the consumer has a reactive power component that is adapted in respect of its phase and/or amplitude and in respect of its frequency to the consumer to compensate for the harmonic reactive power in the consumer.

2. The method according to claim 1 wherein the compensation device is so regulated that the electrical generator produces capacitive reactive power in order to compensate for the inductive reactive power in the consumer.

3. The method according to claim 1 wherein the delivered electrical power is of a frequency which corresponds to the frequency of the reactive power caused by the consumer or represents a multiple of said frequency.

4. The method according to at least one of claim 1 wherein the compensation device operates as an inverter.

5. The method according to claim 1 wherein the compensation device measures the voltage and/or current configurations in the electrical network, preferably at the feed-in point of the electrical power into the network, and in dependence on the measurement results regulates the reactive power component in the electrical power produced by the electrical generator.

6. The method according to claim 1 wherein the voltage produced by the electrical generator is regulated substantially to a predetermined reference value with suitable adaptation of the reactive power component in the electrical power delivered to the consumer.

7. The method according to claim 6 wherein adaptation of the reactive power component is effected by suitable control of the power factor (cos $\phi$) or the phase of the current produced by the electrical generator.

8. The method according to claim 6 in which the electrical generator is connected to an electrical network by way of a line and/or a transformer, further including the step of:

regulating the voltage produced by the electrical generator so that the value thereof is of the order of magnitude of the value of the network voltage or corresponds to the value of the network voltage.

9. An apparatus for producing electrical energy in an electrical network, comprising:

an electrical generator;

a compensation device between the generator and the network, the compensation device adapted to compensate for the reactive power by adaptation of the phase and/or amplitude of the reactive power component of the delivered electrical power; and a regulating device configured to regulate the compensation device in such a way that the electrical power delivered to the consumer has a reactive power component that is adapted in respect of its phase and/or amplitude and in respect of its frequency to the consumer to compensate for the harmonic reactive power in the consumer.

10. The apparatus according to claim 9 wherein the regulating device regulates the compensation device in such a way that the electrical generator produces capacitive reactive power in order to compensate for the inductive reactive power in the consumer.

11. The apparatus according to claim 9 wherein the delivered electrical power is of a frequency which corresponds to the frequency of the reactive power caused by the consumer and represents a multiple of said frequency.

12. The apparatus according to claim 9 wherein the compensation device has an inverter.

13. The apparatus according to claim 9 wherein the regulating device has a measuring device for detecting the voltage and/or current configurations in the electrical network, preferably at the feed-in point of the electrical power into the network.

14. The apparatus according to claim 12 wherein the regulating device controls the inverter in dependence on the measurement results of the measuring device.

15. The apparatus according to claim 9 wherein the regulating device regulates the voltage produced by the electrical generator substantially to a predetermined reference value by control of the reactive power component in the electrical power delivered to the consumer.

16. The apparatus according to claim 15 wherein the regulating device effects adaptation of the reactive power component by suitable control of the power factor (cos $\phi$) or the phase of the current delivered by the electrical generator.

17. The apparatus according to claim 15 wherein the electrical generator is connected to an electrical network by way of a line and/or a transformer characterised in that the regulating device regulates the voltage produced by the electrical generator in such a way that the value thereof is of the order of magnitude of the value of the network voltage or corresponds to the value of the network voltage.

18. A method of reactive power regulation in an electrical network comprising the steps of:

producing electrical power by an electrical generator, preferably driven by the rotor of a wind power installation;

modulating the electrical power by means of a compensation device between the generator and the electrical network for the compensation of reactive power by adaption of the phase and/or amplitude of the reactive power component of the delivered electrical power;

measuring the voltage and/or current configurations in the electrical network, preferably at a feed-in point of the electrical power into the network; and regulating the compensation device in dependence on the measurement results such that the electrical power delivered to the consumer has a reactive power component which is adapted in respect of its phase and/or amplitude and in respect of its frequency to the consumer to compensate for the harmonic reactive power in the consumer.

19. A method of reactive power regulation in an electrical network comprising the steps of:

producing electrical power by an electrical generator, preferably driven by the rotor of a wind power installation;

modulating the electrical power by means of a compensation device between the generator and the electrical network for the compensation of reactive power by adaption of the phase and/or amplitude of the reactive power component of the delivered electrical power;

regulating the compensation device such that the electrical power delivered to the consumer has a reactive power component which is adapted in respect of its phase and/or amplitude and in respect of its frequency to the consumer to compensate for the reactive power in the consumer by regulating the voltage produced by the electrical generator substantially to a predetermined reference value with suitable adaptation of the harmonic reactive power component in the electrical power delivered to the consumer.

20. The method according to claim 18 wherein the compensation device is so regulated that the electrical generator produces capacitive reactive power in order to compensate for the inductive reactive power in the consumer.

21. The method of claim 18 wherein the delivered electrical power is of a frequency which corresponds to the frequency of the reactive power caused by the consumer or represents a multiple of said frequency.

22. The method of claim 18 wherein the compensation device operates as an inverter.

23. The method of claim 18 wherein the current configurations in the electrical network are measured and that the measured signals are continuously analyzed which harmonics are contained therein serving as a reference signal for the compensation device producing the required harmonics to be fed into the electrical network.

24. The method of claim 18 wherein the voltage configurations in the electrical network are measured, that the measured signals are subtracted from a reference signal and that the difference signal is fed to the compensation device producing the required harmonics to be fed into the electrical network.

25. The method of claim 24 wherein adaptation of the reactive power component is effected by suitable control of the power factor (cos φ) or the phase of the current produced by the electrical generator.

26. The method of claim 25 wherein the electrical generator is connected to an electrical network by way of a line and/or a transformer, and wherein the voltage produced by the electrical generator is so regulated that the value thereof is of the order of magnitude of the value of the network voltage or corresponds to the value of the network voltage.

27. An apparatus for producing electrical energy in an electrical network comprising:

an electrical generator, preferably driven by the rotor of a wind power installation, a compensation device between the generator and the network for the compensation of reactive power by adaption of the phase and/or amplitude of the reactive power component of the delivered electrical power, a measuring device for measuring the voltage and/or current configurations in the electrical network, preferably at the feed-in point of the electrical power into the network, and a regulating device for regulating the compensation device in dependence on the measurement results in such a way that the electrical power delivered to the consumer has a reactive power component which is adapted in respect of its phase and/or amplitude and in respect of its frequency to the consumer to compensate for the harmonic reactive power in the consumer.

28. An apparatus for producing electrical energy in an electrical network comprising:

an electrical generator, preferably driven by the rotor of a wind power installation, a compensation device between the generator and the network for the compensation of reactive power by adaption of the phase and/or amplitude of the reactive power component of the delivered electrical power, and a regulating device for regulating the compensation device in such a way that the electrical power delivered to the consumer has a reactive power component which is adapted in respect of its phase and/or amplitude and in respect of its frequency to the consumer to compensate for the reactive power in the consumer by regulating the voltage produced by the electrical generator substantially to a predetermined reference value with suitable adaptation of the harmonic reactive power component in the electrical power delivered to the consumer.

29. The apparatus of claim 28 wherein the regulating device regulates the compensation device in such a way that the electrical generator produces capacitive reactive power in order to compensate for the inductive reactive power in the consumer.

30. The apparatus of claim 29 wherein the delivered electrical power is of a frequency which corresponds to the frequency of the reactive power caused by the consumer and represents a multiple of said frequency.

31. The apparatus of claim 30 wherein the compensation device has an inverter.

32. The apparatus of claim 31 wherein the regulating device has a measuring device for detecting the current configurations in the electrical network and an evaluation device for continuously analyzing which harmonics are contained therein serving as a reference signal for the compensation device producing the required harmonics to be fed into the electrical network.

33. The apparatus of claim 32 wherein the regulating device controls the inverter in dependence on the measurement results of the measuring device.

34. The apparatus of claim 33 wherein the regulating device has a measuring device for detecting the voltage configurations in the electrical network and a subtracting device for subtracting the measured signals from a reference signal wherein the difference signal is fed to the compensation device producing the required harmonics to be fed into the electrical network.

35. The apparatus of claim 34 wherein the regulating device effects adaptation of the reactive power component by suitable control of the power factor (cos φ) or the phase of the current delivered by the electrical generator.

36. The apparatus of claim 35 wherein the electrical generator is connected to an electrical network by way of a line and/or a transformer and wherein the regulating device regulates the voltage produced by the electrical generator in such a way that the value thereof is of the order of magnitude of the value of the network voltage or corresponds to the value of the network voltage.

37. A wind power installation comprising an apparatus as claimed in claim 27.

* * * * *